Figure 1:
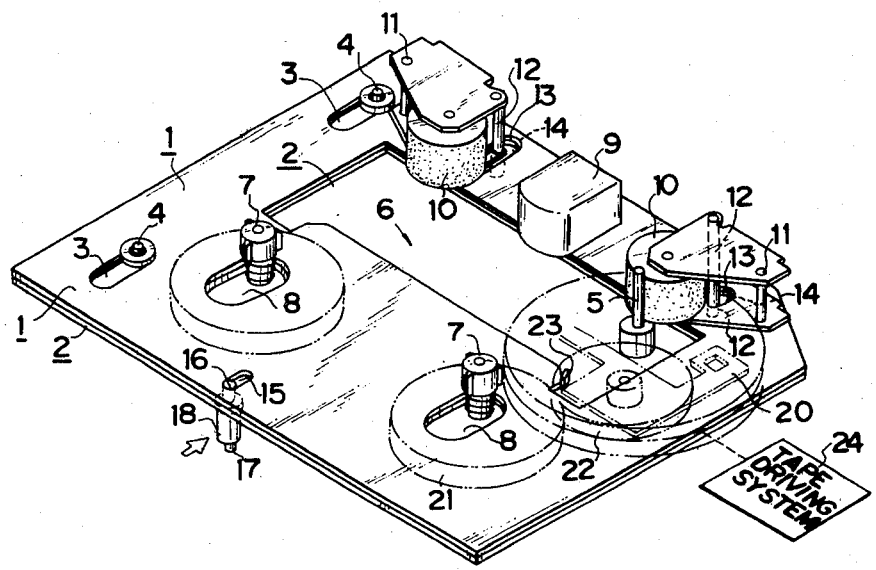

United States Patent [19]

Yokota et al.

[11] 4,402,026
[45] Aug. 30, 1983

[54] MAGNETIC RECORD/PLAYBACK APPARATUS

[75] Inventors: Tadashi Yokota; Wataru Watanabe, both of Toda, Japan

[73] Assignee: Clarion Co., Ltd., Tokyo, Japan

[21] Appl. No.: 236,837

[22] Filed: Feb. 23, 1981

[30] Foreign Application Priority Data

Feb. 25, 1980 [JP] Japan ................. 55-22365

[51] Int. Cl.³ .................... G11B 5/54; G11B 21/12
[52] U.S. Cl. ...................... 360/105; 369/28
[58] Field of Search ............... 360/105, 103, 75, 72.1, 360/72.3; 369/28; 242/200

[56] References Cited

U.S. PATENT DOCUMENTS

| 4,200,893 | 4/1980 | Matison | 369/28 |
| 4,263,631 | 4/1981 | Takanashi | 360/105 |
| 4,280,154 | 7/1981 | Ando | 360/105 |
| 4,328,520 | 4/1982 | Iwata | 360/105 |

*Primary Examiner*—Robert M. Kilgore
*Attorney, Agent, or Firm*—Wallenstein, Wagner, Hattis, Strampel & Aubel

[57] ABSTRACT

A magnetic record/playback apparatus has a head plate and a control plate which are disposed on a tape deck slidably movable in forward and rearward directions. A head is fixed on the head plate and a changeover mechanism for putting a tape driving system selectively into a cue scanning mode is engaged by motion of the control plate. The head plate is formed with an elongated slot extending in the displacement direction of the plates and the control plate is provided with a pin slidable within the elongated slot. The control plate is engaged by a scanning mode operating rod for displacing the control plate forwardly to put the system into normal play or scanning mode and rearwardly.

8 Claims, 2 Drawing Figures

U.S. Patent

Aug. 30, 1983

4,402,026

MAGNETIC RECORD/PLAYBACK APPARATUS

BACKGROUND OF THE INVENTION

1. Field of the Invention

This invention generally relates to a magnetic record/playback apparatus, and more particularly to a magnetic record/playback apparatus having an automatic music sensing mechanism.

2. Description of the Prior Art

In scanning tape players, to select a desired song from plural songs recorded on a cassette tape by obtaining a cue for the song by an automatic music sensing means, a tape is driven in a cue scanning fast-forward or rewind mode (hereinafter referred to as a "FF/REW mode"). A cue signal recorded on the tape, indicating the beginning of the desired song, is detected by a magnetic head. Then, the cassette drive system is released from the FF/REW mode by the signal and the apparatus is put into an ordinary playback mode. More particularly, to effect an automatic music sensing operation in the cassette deck, it is essential that (1) the tape be driven in the FF/REW mode and (2) the tape be kept in contact with the head while being driven in the FF/REW mode. In general, however, to establish the FF/REW mode in a cassette deck, it is necessary to detach a pinch roller from a capstan shaft of the tape driving system or alternatively an idler of a reel shaft driving system by insituting a changeover operation. The distance of the displacement of the pinch roller caused by such a changeover operation is much larger than the displacement distance of the head in retiring from a record/playback position to an automatic music sensing position. However, the conventional FF/REW mechanism is so designed that a head and its pinch roller are mounted on a single head plate, and the driving system is adapted to be changed over by the displacement of the head plate. Therefore, when the deck is put into the scanning mode by displacement of the head plate, the head is separated too far away from the tape to detect the cue signal on the tape. On the other hand, when the head plate is brought into a position where the head can lightly contact the tape, the tape driving system cannot fully be put into the scanning mode with the pinch roller fully disengaged.

SUMMARY OF THE INVENTION

It is therefore an object of the present invention to provide a magnetic record/playback apparatus which is capable of obviating the defects of the conventional apparatus.

In accordance with the present invention, there is provide a magnetic record/play back apparatus comprising:

a magnetic head holding means holding a magnetic head thereon and adapted to be displaced conjointly with said magnetic head;

a FF/REW responsive means or control member displaceable in response to an FF/REW operation;

a tape driving means;

a driving changeover means holding said tape driving means and interlocked to said FF/REW responsive means; and a setting means for setting, during a record/playback operation, said magnetic head holding means and said FF/REW responsive means into a position where a tape is pressed against said magnetic head and driven by said tape driving means and setting, during a FF/REW operation, said magnetic head holding means and said FF/REW responsive means into a position where the tape is in light contact with said magnetic head.

BRIEF DESCRIPTION OF THE INVENTION

Figure 2:
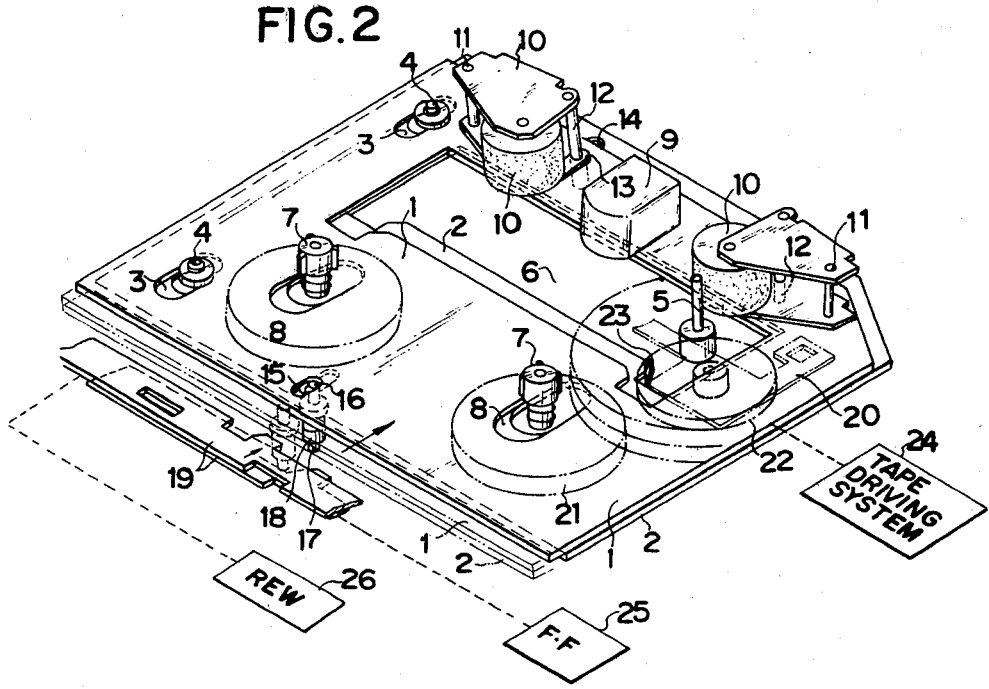

FIG. 1 is a perspective view of one form of automatic music sensing mechanism employable in a magnetic record/playback apparatus according to the present invention, illustrated in its position before actuation; and FIG. 2 is a similar view of the automatic music sensing mechanism of FIG. 1, illustrated in its position during the scanning operation.

DESCRIPTION OF THE INVENTION

The invention will now be described in connection with an embodiment illustrated in the drawing. In the figures, 1 is a head plate, 2 is a FF/REW plate (control member) disposed under the head plate 1. The head plate 1 and the FF/REW plate are slidably mounted on a deck plate of a tape deck to move forwardly or rearwardly relative to a FF/REW operating rod 19 as will be described in detail later. To this end, each of the plates 1 and 2 has a pair of guide slots 3 extending along the sliding direction thereof, and a guide pin fixed to the deck plate is inserted through the guide slots 3. Each of the plates 1 and 2 has an opening 6 for allowing a capstan shaft 5 and a pack guide pin provided on a deck plate to extend upwardly therethrough and a pair of apertures 8 8 for letting reel shafts 7 7 project therethrough, respectively.

A magnetic head 9 is fixed on the head plate 1 at a position adjacent the opening 6. A pair of pinch rollers 10 10 rotatably mounted on pinch roller controls 10' are disposed on the head plate 1 on opposite sides of the head 9. A shaft 11 of each of the pinch roller supports 10' is fixed to the head plate 1. Each of the pinch roller supports 10' has a tractive rod 12 for rotating the pinch roller 10' around the shaft 11. The tractive rod 12 extends through a through aperture 13 formed on the head plate 1 and is received in a receiving aperture 14 formed on the FF/REW plate 2.

An elongated slot 15 extending in the direction of displacement of the head plate 1 is formed on the head plate 1 at a position opposite to the head 9. This slot 15 is engaged with a pin 16 projected from the FF/REW plate 2. The slot 15 has a length corresponding to the desired difference in the amount of displacement between the pinch rollers and the head 9 at the time of automatic music sensing operation, and the pin 16 moves within the slot 15.

A push-rod 17 for displacing the FF/REW plate 2 and the head plate 1 interlocked thereto is fixed to a lower face of the FF/REW plate 2. Although an upper end of the push-rod 17 projects from the FF/REW plate to form the pin 16 in the embodiment illustrated, the push-rod 17 may be provided independently of the pin 16. A roller 18 is rotatably fitted around the push-rod 17. The roller 18 is engaged with the FF/REW operating member 19 provided on the tape deck. This operating member 19 is operated in a conventional manner by a FF (fast forward) control 25 or a REW (rewind) control 26. The FF/REW plate 2 is further interlocked to a changeover mechanism (not shown) for idlers in the drive system of the reel shafts 7. More specifically, an idler 22 adapted to be pressed against each of reel bases 21 is provided on an idler plate 20.

The idler plate 20 has a projection 23 which is engaged with an edge of the opening 6 formed on the FF/REW plate 2. The idler 22 is driven in a conventional manner by a tape driving system 24, but the detailed description of the operation of this system is not important to the present invention and is therefore omitted here.

The operation of the automatic music sensing mechanism of the present invention will now be described.

In record/playback mode, (See FIG. 1) the head plate 1 and the FF/REW plate 2 are in respective advanced positions relative to a tape. As a result, the pinch roller 10 is pressed against and rotated by the capstan shaft 5, so that the tape runs at a normal speed and the head 9 is pressed against a face of the tape.

Alternatively, when the FF/REW operating member 19 is depressed so as to push the push-rod 17 interlocked to the operating member 19 through the roller 18, in the direction of an arrow in FIG. 1, the FF/REW plate 2 with the push-rod 17 fixed thereto, is displaced (See FIG. 2). As a result, the tractive rod 12 of the pinch roller 10 engaged with the aperture 14 formed on the FF/REW plate 2 is pushed, so that the pinch roller 10 is disengaged from the capstan shaft 5. At the same time, the idler plate 20 engaged with the edge of the opening 6 of the FF/REW plate 2 is pushed, so that the idler 22 is disengaged from the reel base 21 to move the tape driving system towards the FF/REW scanning position.

As the FF/REW plate 2 is displaced, the pin 16 provided on the FF/REW plate 2 moves rearwardly within the elongated slot 15 of the head plate 1 until it reaches the rear end of the elongated slot 15. When the FF/REW plate is further displaced, the pin 16 pushes the head plate 1 to move with it. As a result, the head 9 fixed to the head plate 1 is retreats to a position where the head 9 is in light contact withthe tape. In the meantime, the pinch roller 10 and the idler plate 20 are further pushed by the FF/REW plate 1 while being spaced away from the capstan shaft 5 and the reelbase 21, respectively. When the movement of the head plate 1 to the automatic music sensing position has been completed, the tape driving system including the pinch roller is also fully brought into the FF/REW mode.

Although the embodiment of the present invention has an arrangement as described above, the invention is not limited thereto. For example, the relation between the pin and the elongated slot for interlocking the head plate to the FF/REW plate may be vice versa, i.e., an elongated slot formed on the FF/REW plate may be combined with a pin provided on the head plate. The engagement between the FF/REW plate and the changeover mechanism for the tape driving system, such as the tractive rod, idler plate, etc. may alternatively be attained by other suitable conventional methods.

As described above, according to the present invention, the movement of the FF/REW plate is much larger than that of the head plate when the FF/REW operating rod is depressed, so that the displacement of the tape driving system can be larger than the retreat of the head. Thus, the changeover operation into the FF/REW mode for automatic music sensing operation and the detection of a cue signal from the tape for the automatic music sensing operation may be readily attained. In addition, the difference in displacement distances between the FF/REW plate and the head plate can advantageously be achieved by the simple means such as the pin and the elongated slot. This is advantageous, especially, for imparting to an existing cassette deck comprised of a single head plate and having no automatic music sensing function, an automatic music sensing mechanism, simply by adding the FF/REW plate.

We claim:

1. In a magnetic tape playback apparatus for sensing beginning-of-music cues in a cue-scanning mode, said apparatus including a tape cassette support means comprising supply and take-up reel-receiving means, and fast forward and rewind drive means selectively driving said supply or take-up reel-receiving means at a fast speed during said cue-scanning mode or for normal fast forward and fast rewind of the tape, the improvement comprising:

a head support member having a magnetic head thereon and displaceable conjointly over a given distance with said magnetic head between a first position where said head is pressed snugly against the tape for normal play to a second position where the head is pressed in light contact with the tape for cue-scanning;

tape running means including means for engaging and driving said tape at a normal play speed and movable between a first tape engaging and driving position to a second tape disengaging position where said take-up reel-receiving means is driven at a high cue-scanning speed;

a control member for controlling the position of said engaging means of said tape running means and displaceable over a distance greater than said given distance and between a first position where said tape running means is in said first tape engaging and driving position to a second position where said tape running means is in said second position disengaged from said tape; and manually operable setting means for controlling the positions of said head support and control members and movable over a given distance from an initial playback operating position where said head support and control members are in said first positions to a cue-scanning position where said head support and control members have moved different distances into said second positions for effecting a cue-scanning mode of operation.

2. The magnetic tape playback apparatus of claim 1, further wherein said manually operable setting means includes a search mode actuating push rod which moves at all times with said control member and which is connected to said control member through a slot in said head support member to form a lost motion connection therebetween.

3. The apparatus of claim 1 wherein said head member and said control member are configured as generally planar plates disposed in parallel contiguous relationship.

4. The magnetic playback apparatus according to claim 1, wherein said head support member has at one end portion thereof an elongated slot and at the opposite end portion thereof a through aperture, said control member having a receiving aperture opposite to said aperture thereof, and said setting means includes:

a push-rod fixed to said control member;

a pin affixed to said push-rod and disposed to slide within said elongated slot, and said tape running means comprises:

at least one motor driven capstan shaft;

at least one pinch roller manually mounted in a pinch roller mount pivotally supported on said head member to place said roller selectively attached to or spaced from capstan shaft; and a tractive rod affixed to said control member and passing through said through aperture for pivoting said at least one pinch roller mount between capstan tape pressing engaging and disengaging positions in response to movement of said control member.

5. The magnetic tape playback apparatus of claim 1 wherein said head support member and said control member have apertures therein for allowing the reel-receiving means to extend therethrough in all of said position of said head member and said control member.

6. The apparatus according to claim 5, wherein there is provided idler means movably engageable by said control member and adapted to be pressed against at least one of said reel-receiving means and rotated by a motor drive.

7. The apparatus of claim 1 wherein said setting means includes a lost motion actuator means operated by a single movable member and selectively coupling said head support member and said control member so that by operating said movable member to a first position thereof said head support member and said control member are disposed in said first positions thereof, by operating said movable member from the first position thereof to an intermediate position thereof only said control member is moved from the first position thereof to an intermediate position thereof, and so that by operating said movable member from said intermediate position thereof to a second position thereof said head support member and said control member are collectively moved to said second position respectively.

8. The apparatus of claim 7 wherein said head support member and said control member are cconfigured as generally planar plates, and one of said head support member and said control member slidably supportingly engages the other of same.

* * * * *

UNITED STATES PATENT AND TRADEMARK OFFICE
CERTIFICATE OF CORRECTION

PATENT NO. : 4,402,026
DATED : August 30, 1983
INVENTOR(S) : Tadashi Yokota et al.

It is certified that error appears in the above-identified patent and that said Letters Patent is hereby corrected as shown below:

Column 5, line 1, "manually" should read -- pivotally --.

Column 5, line 2, after "head" should read -- support --.

Column 5, line 4, after "from" should read -- said --.

Signed and Sealed this

Twenty-fourth Day of July 1984

[SEAL]

Attest:

GERALD J. MOSSINGHOFF

Attesting Officer    Commissioner of Patents and Trademarks